(12) United States Patent
Weir

(10) Patent No.: US 7,260,920 B2
(45) Date of Patent: Aug. 28, 2007

(54) MOUNTING STRUCTURE FOR ATTACHMENT TO A BUILDING

(76) Inventor: Kenneth C. Weir, 15 McCallum Drive, Truro, Nova Scotia (CA)

( * ) Notice: Subject to any disclaimer, the term of this patent is extended or adjusted under 35 U.S.C. 154(b) by 489 days.

(21) Appl. No.: 10/991,418

(22) Filed: Nov. 19, 2004

(65) Prior Publication Data

US 2005/0252155 A1    Nov. 17, 2005

Related U.S. Application Data

(60) Provisional application No. 60/558,358, filed on Apr. 1, 2004.

(51) Int. Cl.
- E04B 1/38 (2006.01)
- E04C 5/00 (2006.01)
- E04F 19/00 (2006.01)
- E04H 14/00 (2006.01)
- A47L 3/00 (2006.01)
- E04G 3/20 (2006.01)
- G09F 7/18 (2006.01)
- A47F 5/00 (2006.01)
- A47H 1/10 (2006.01)

(52) U.S. Cl. ................. 52/712; 52/27; 52/37; 52/38; 52/714; 248/300

(58) Field of Classification Search .............. 52/27, 52/37, 38, 698, 712, 714; 248/200, 300, 248/534

See application file for complete search history.

(56) References Cited

U.S. PATENT DOCUMENTS

| 4,635,168 A | * | 1/1987 | Crowley | 362/147 |
|---|---|---|---|---|
| 4,726,152 A | | 2/1988 | Vagedes et al. | |
| 4,887,195 A | | 12/1989 | Donelan | |
| 5,000,409 A | * | 3/1991 | MacLeod et al. | 248/205.1 |
| 5,275,366 A | * | 1/1994 | Simmons | 248/205.1 |
| 5,397,093 A | | 3/1995 | Chubb et al. | |
| D362,173 S | * | 9/1995 | Skitromo | D8/350 |
| 5,549,266 A | * | 8/1996 | Mitchell et al. | 248/205.1 |
| 5,577,702 A | | 11/1996 | Chubb et al. | |
| 5,617,680 A | * | 4/1997 | Beatty | 52/27 |
| 5,775,032 A | * | 7/1998 | Lacy | 52/28 |
| 5,886,673 A | | 3/1999 | Thomas | |
| 6,276,654 B1 | * | 8/2001 | Perkins | 248/694 |
| 6,289,617 B1 | * | 9/2001 | Snyder | 40/584 |
| 6,396,459 B1 | | 5/2002 | Pullman | |
| 6,404,405 B2 | | 6/2002 | Wanat | |
| 6,444,906 B1 | | 9/2002 | Lewis | |

(Continued)

Primary Examiner—Carl D. Friedman
Assistant Examiner—Hunter M Dreidame
(74) Attorney, Agent, or Firm—McFadden, Fincham

(57) ABSTRACT

A mounting structure, for attachment to a building, for mounting articles such as satellite dishes, flags and other articles, comprises a unitary rectangular substantially flat panel having top and bottom flanges, side edges and an inner surface. Bosses are formed in each flanged spaced apart and adjacent side edges. A central embossed portion extends up from the flange at top and bottom. A central protrusion, and two side protrusions, extend inwardly from the inner surface of the panel, in lateral alignment. An inclined portion extends inwardly from the inner surface of the panel at each side and bending into the side ends of the upper flange. Flange portions extend between the central embossed portion and the bosses and between the bosses and the side edges at the top and bottom flanges. In position, the flange portions, central protrusions and the side protrusions contact the siding.

8 Claims, 19 Drawing Sheets

U.S. PATENT DOCUMENTS 6,460,821 B1    10/2002  Rhudy et al.
7,115,820 B1 *  10/2006  Gretz .................... 174/481

2006/0016947 A1 *  1/2006  Capozzi et al. .......... 248/284.1
2007/0044401 A1 *  3/2007  Bonshor .................... 52/213

* cited by examiner

MOUNTING STRUCTURE FOR ATTACHMENT TO A BUILDING

CROSS REFERENCE TO RELATED APPLICATIONS

This application is a Non-Provisional Application, claiming priority under 35 U.S.C. 119(e) to U.S. Provisional Application Ser. No. 60/558,358, filed, 01 Apr. 2004, which is incorporated herein by reference in its entirety.

FIELD OF INVENTION

This invention relates to mounting structures, or similar structures, and particularly to a mounting structure for attachment to a wall or other part of a building. In particular it relates to attachment to a wall covered via siding material.

BACKGROUND OF THE INVENTION

Mountings for satellite dishes, and similar structures, are well known and have been used for many years. Typically, when a satellite dish, or other structure, is mounted on the side of a building covered with siding, such as aluminum vinyl or other material, the siding is trimmed to expose the underlying wall, the siding being removed at that location. This provides a solid base for attachment of the mounting structure. Other arrangements have been proposed to enable a mounting structure to be attached over the siding, comprising a number of members for positioning relative positions so as to accommodate the variable profile of the siding.

It is desirable to provide a mounting bracket or structure which can be used with different types of new or existing siding on a building, without removing a portion of the siding, or damaging the siding. In the preferred embodiment the mounting structure comprises a unitary member for mounting of a satellite dish on a wall of a building, over the siding, without removal of any part of the siding or damage to the siding.

DESCRIPTION OF THE PRIOR ART

As stated above, in one form of attaching a structure, a localized portion of siding is removed to expose the underlying wall, the satellite dish, or other structure, then being mounted directly on the wall. Typical of such arrangements are described in U.S. Pat. Nos. 4,726,152 and 6,396,459. In U.S. Pat. No. 4,726,152, one member extends into an aperture in the siding while a surrounding structure engages with the siding. In U.S. Pat. No. 6,396,459 a base plate is mounted in a cut-out portion of the siding. A covering ring-shaped trim member covers the cut edges of the cut-out portion.

Another form of attaching a structure has members which bridge formations on the siding and onto which a mounting structure can be attached. U.S. Pat. No. 4,887,195, describes the mounting in which two spaced members are mounted on the covered wall and then a further member is attached to the spaced members. In U.S. Pat. No. 5,617,680, a bridge portion is connected to and supported by two leg portions, in turn connected to two foot portions. A bridge portion is supported clear of any unevenness of the roof or wall structure of a building.

It is desirable that the mounting structure be of unitary form, avoiding the necessity of assembly of parts, nor require any removal of siding and be acceptable of varying profiles.

SUMMARY OF THE INVENTION

The present invention provides for a unitary mounting structure for attachment to a building wall, over any existing siding, without requiring removal of any part of the siding. No damage will occur to the siding. The structure can be profiled to mount over varying sizes, and/or patterns of siding, and is still applicable if siding is not present.

Thus, in accordance with the present invention, there is provided a mounting structure for attachment to a building, comprising a substantially planar panel having an inner surface, side edges and top and bottom flanges at opposed ends of the panel, each flange having a central embossed portion, a boss on each side of the central embossed portion and spaced therefrom, the bosses spaced inward from the side edges of the panel, a central protrusion extending inwardly from the inner surface of a panel and a side protrusion at each edge extending inwardly from the inner surface, the central and side protrusions in lateral alignment and an inclined portion at each side of the panel at the top of flanges, the inclined portions extending inwardly from the inner surface of top flange.

Preferably flange portions extend between the bosses and the central embossed portions, and between the bosses and the adjacent side edges, at each flange.

BRIEF DESCRIPTION OF THE DRAWINGS

The various advantages and features of the present invention will be apparent from a consideration of the accompanying drawings in which.

DETAILED DESCRIPTION OF THE PREFERRED EMBODIMENT

Figure 1:
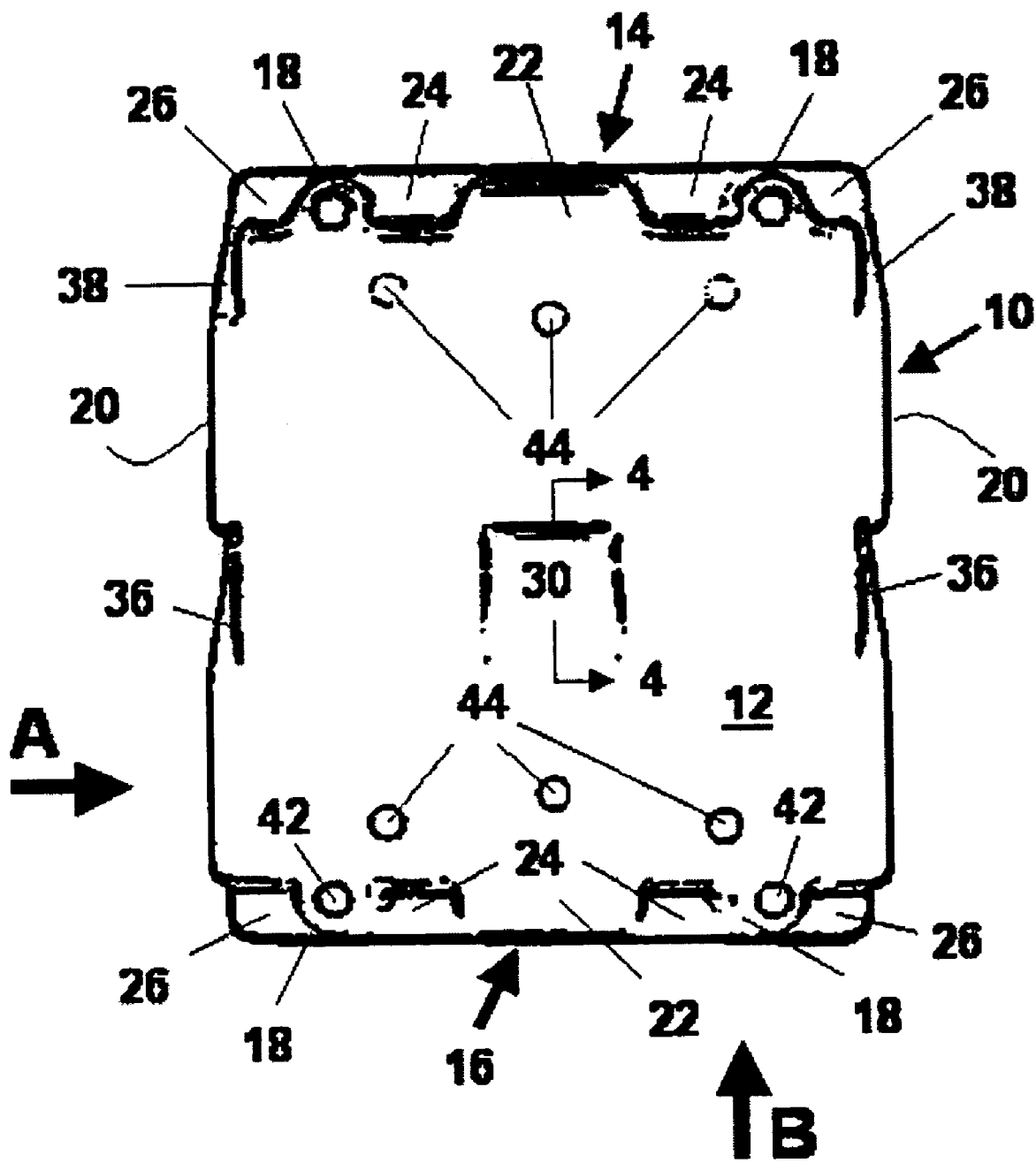
FIG. 1 is a front view of one form of mounting structure.

FIGS. 1 to 4 illustrate one form of the present invention, a mounting structure in the form of a unitary member 10 comprising a main substantially planar front panel 12, a top flange 14 and a bottom flange 16, and also an inner surface 28.

Top flange 14 has two spaced bosses 18, one at each side spaced in from the side edges 20 of the panel 12. A central embossed portion 22 extends between the bosses 18, and is spaced slightly at each end from the bosses. Between the bosses 18 and the embossed portion 22 there is a flat flanged portion 24, which also extends at 26 from bosses 18 to the side edges 20 of the panel.

A similar formation extends at the bottom flange 16, with the same features having the same identifying numerals as for the top flange 14.

Midway between the top and bottom flanges is a central protrusion 30 extending inwardly from the inner surface 28 of the panel 12, in the same direction as the flanges 14 and 16. This protrusion in the example extends to form an inclined bottom surface 32, the surface inclining inwardly and toward the top flange, with a front wall 34. This can be seen readily in FIG. 3.

At each side edge 20, aligned with the central protrusion 30, there is provided a narrow side protrusion 36 having a similar profile to that of central protrusion 30.

At the upper part of each side edge 20 there is formed an inclined portion 38, extending down from the panel 12 to blend in with the flat flange portions 26 at the top flange.

Figure 2:
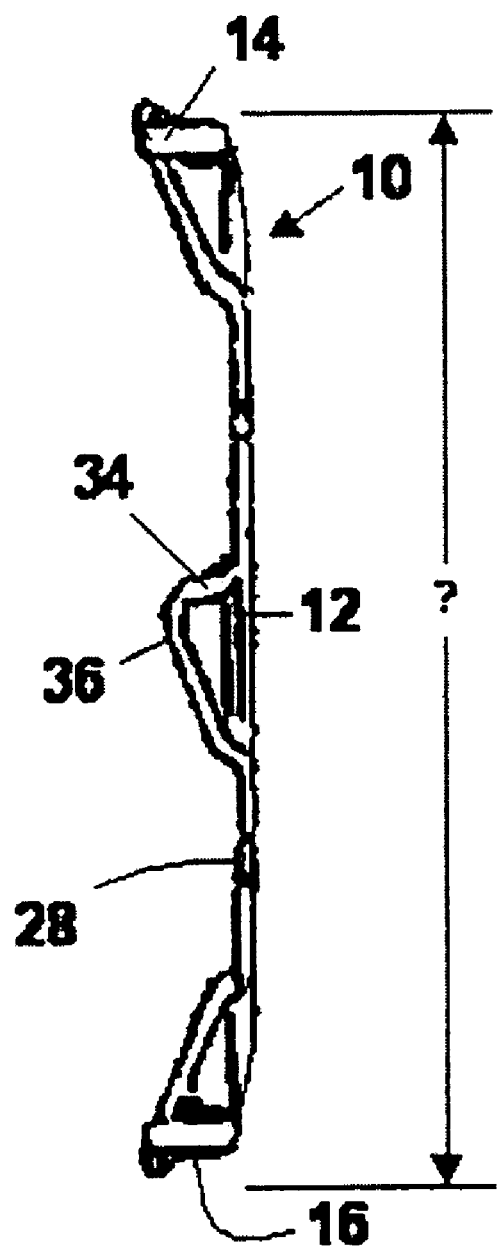
FIG. 2 is a side view in the direction of arrow A in FIG. 1.
Figure 3:
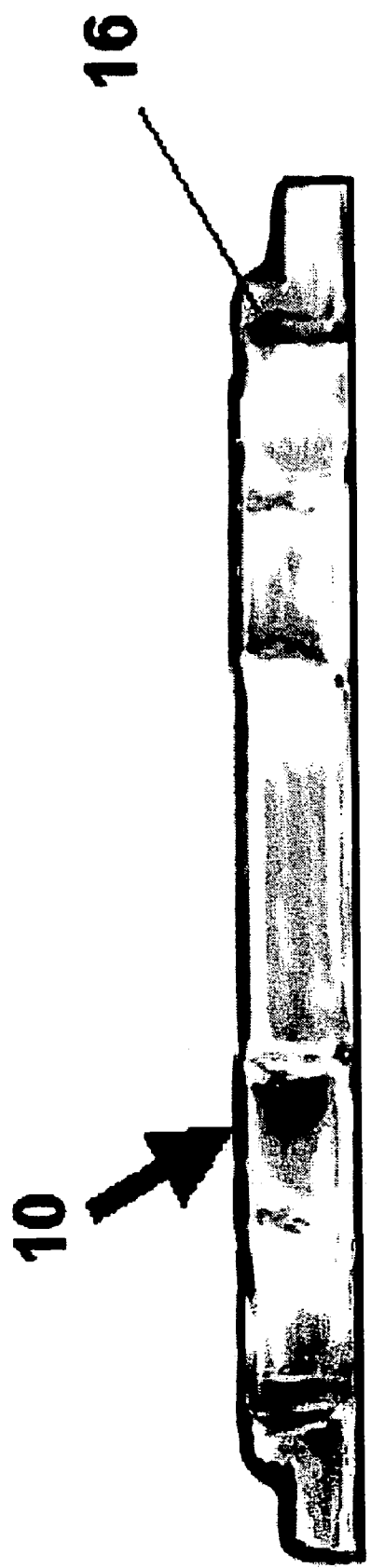
FIG. 3 is a bottom view, in the direction of arrow B in FIG. 1.
Figure 4:
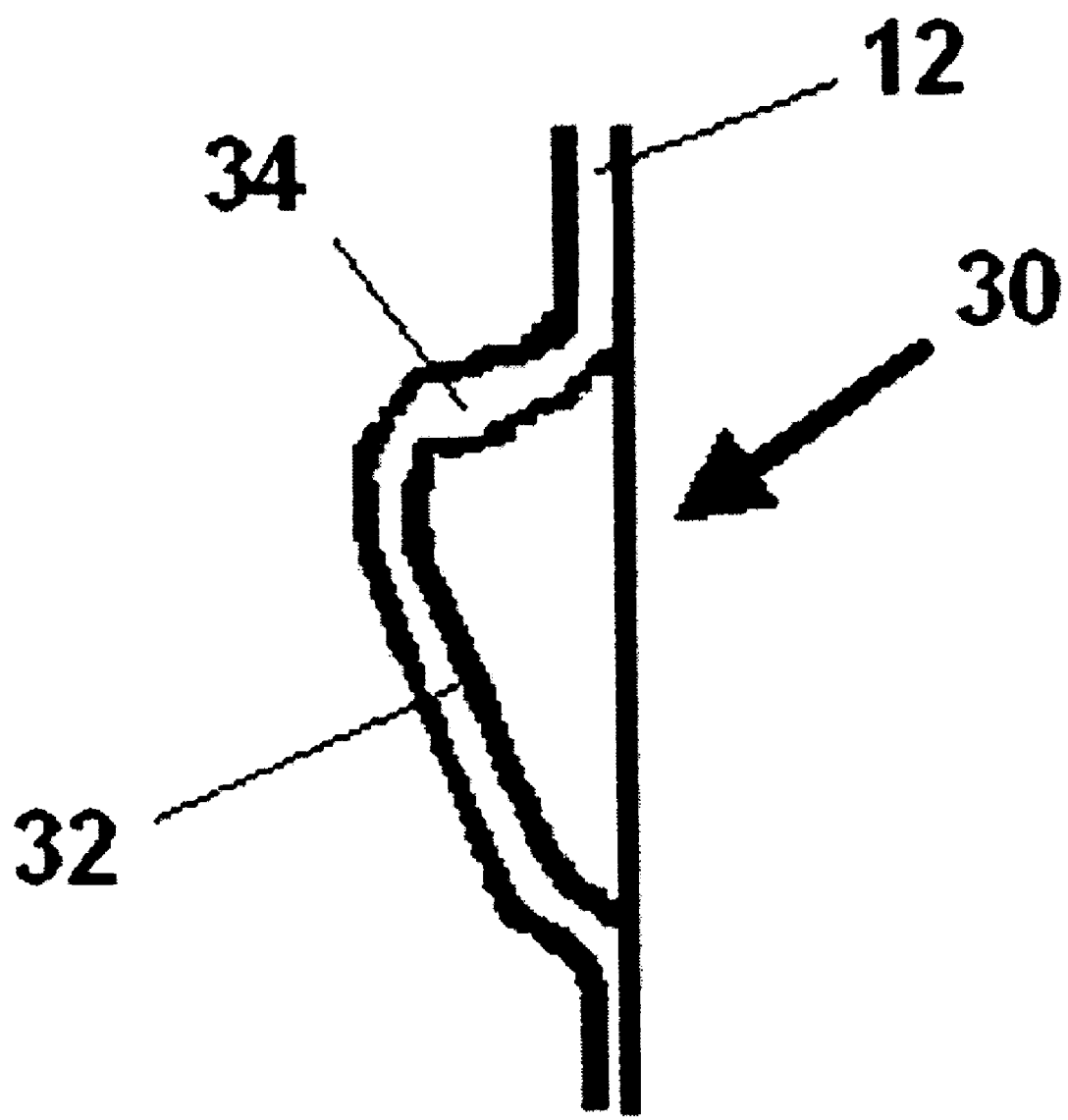
FIG. 4 is a cross section on the line 4-4 in FIG. 1.

When viewed from the side, as in FIG. 2, the formations of protrusions 30, 36 and 38, together with the panel 12, form a profile which sits firmly on the siding attached to the building. In the example, it can fit over either a double or a single form of shingle, that is the shingle can have a profile of two inclined sections, or a single inclined section under each mounting structure.

The formations or protrusions 30, 36 and 38 rest on the siding, when the mounting structure is attached to the building, holding the member 10 slightly spaced from the siding in a firm position. In the example illustrated in the drawings, the protrusions or shapes of profile to conform, at least to some extent, with the profile of the siding. However other shapes or profiles can be used, the object being to provide a firm contact with the siding without damaging it, in conjunction with the flange portions 24 and 26.

Each boss 18 has a hole 42 therein for the passage of attaching means such as screws or bolts for attachments of the structure to the building. Further holes 44 are provided for attachment of the structure to an article to be attached to the building, for example a satellite dish.

Figure 5:
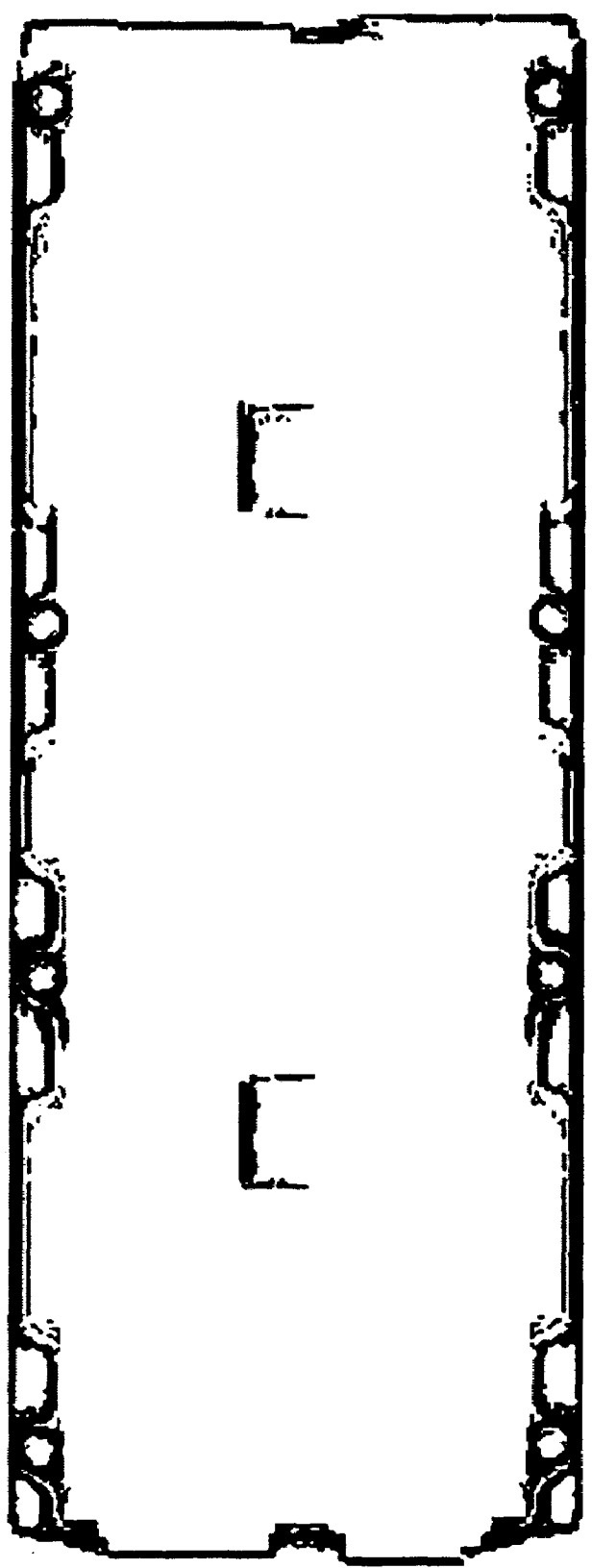
FIG. 5 is a front view, similar to that of FIG. 1, illustrating a multiple form of structure.

The structure illustrated in FIGS. 1 to 5 is for mounting a single article on a building. The structures can be made to mount a plurality of articles. As seen in FIG. 5, a partial view of a top part of a mounting structure, with the same identifying references being used as in FIGS. 1 to 4, is for mounting two articles side by side. The central pair of bosses may, or may not, be provided. The embossed portions 22 can be combined into a single formation.

The actual size of the structure can be varied according to the particular siding to be accommodating. Thus, as an example the mounting structures can be mounted on sidings known as Vinyl Double 5, Aluminum Double 5 or Single 10, using one size of structure or on Vinyl Double 4, Aluminum Double 4, or a Single 8. The height of the mounting structure will vary, that is the dimension "h" in FIG. 2.

In the examples described above and illustrated in FIGS. 1 to 4, a typical size of a member 10, dimension "h" in FIG. 2, is approximately 8" of Double 4 or Single 8 siding and about 10" for Double 5 or Single 10 siding. Conveniently the number 10 is made of a clear molded plastic material, but colored materials can be used. The overall thickness of the number 10 is of the order ½ inch or so.

Figure 6:
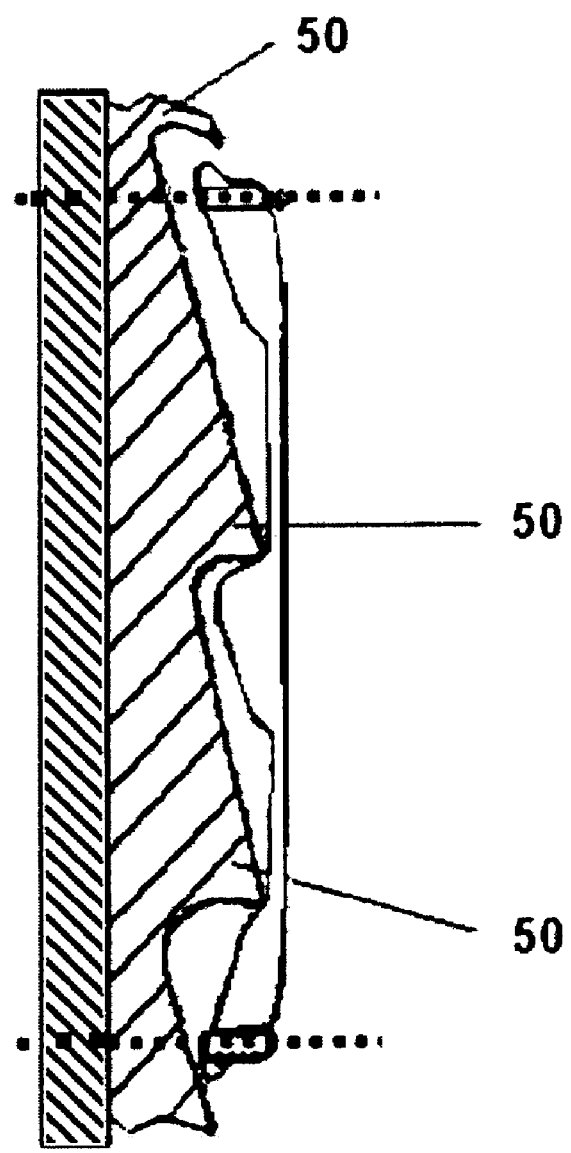
FIG. 6 is a cross-sectional view of a mounting structure attached to a building.
Figure 7A:
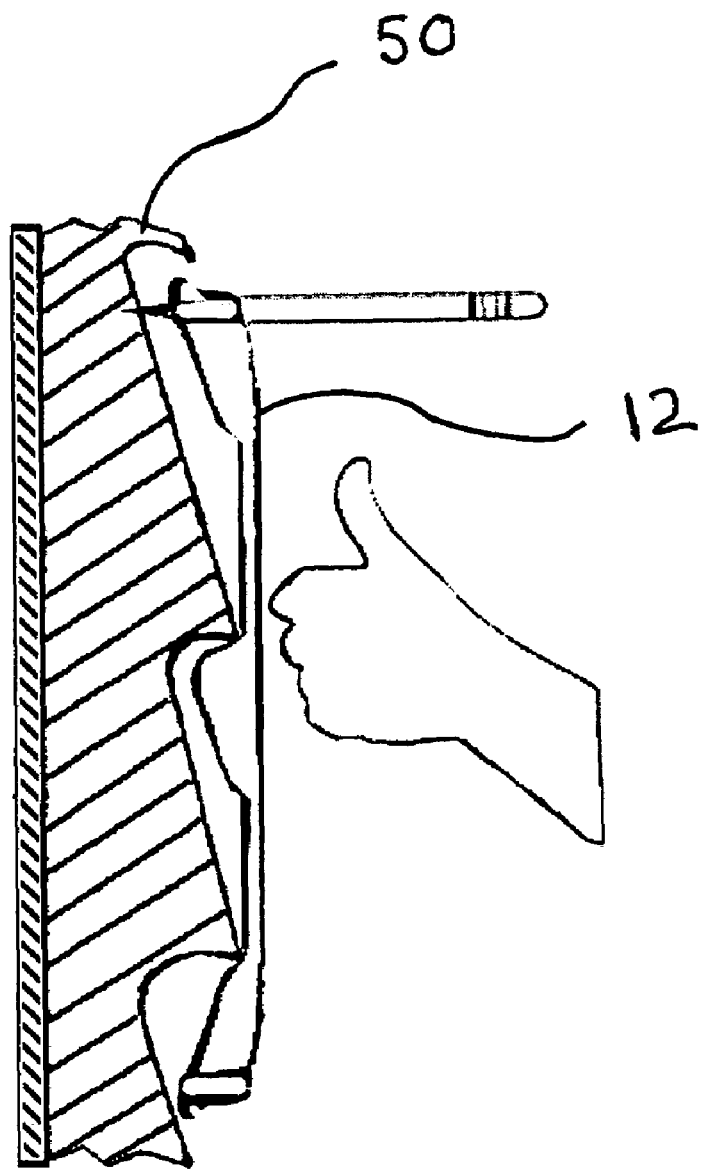
FIGS. 7(*a*) to 7(*e*) are a series of side views illustrating various steps of mounting a satellite dish.
Figure 7B:
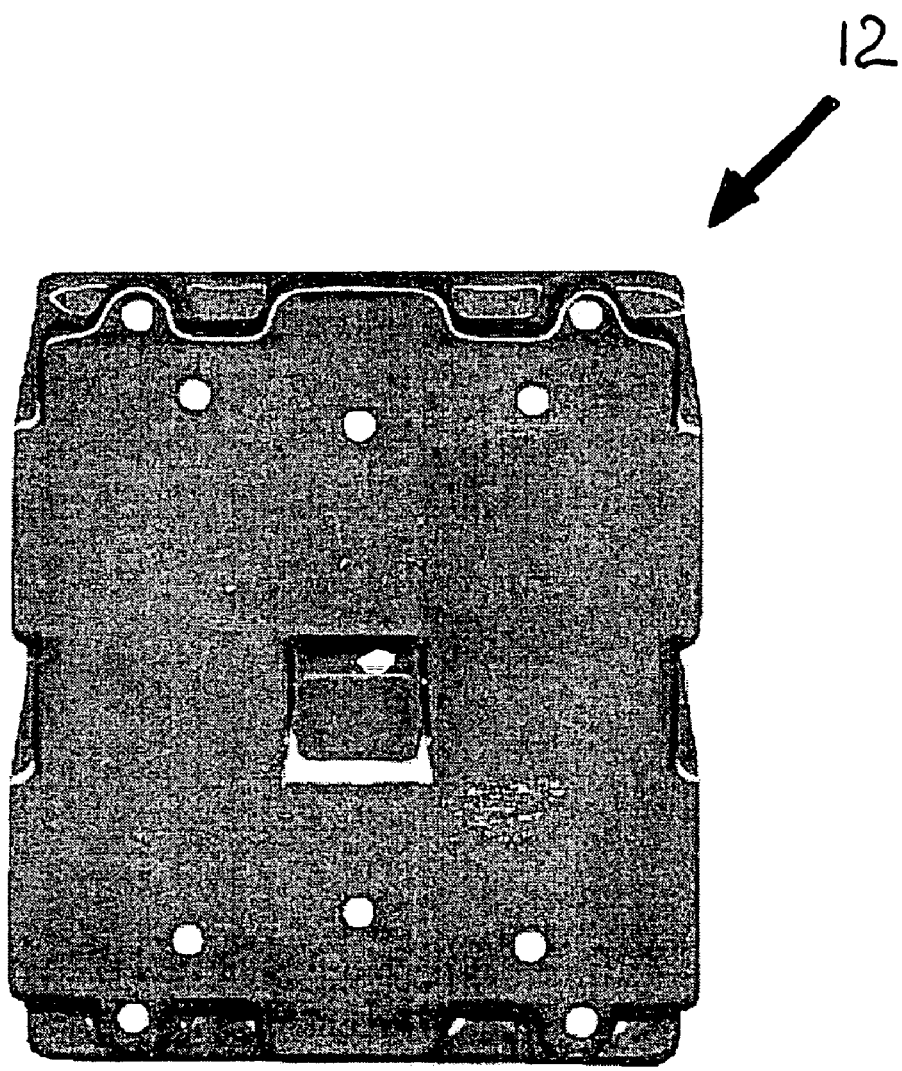
Figure 7C:
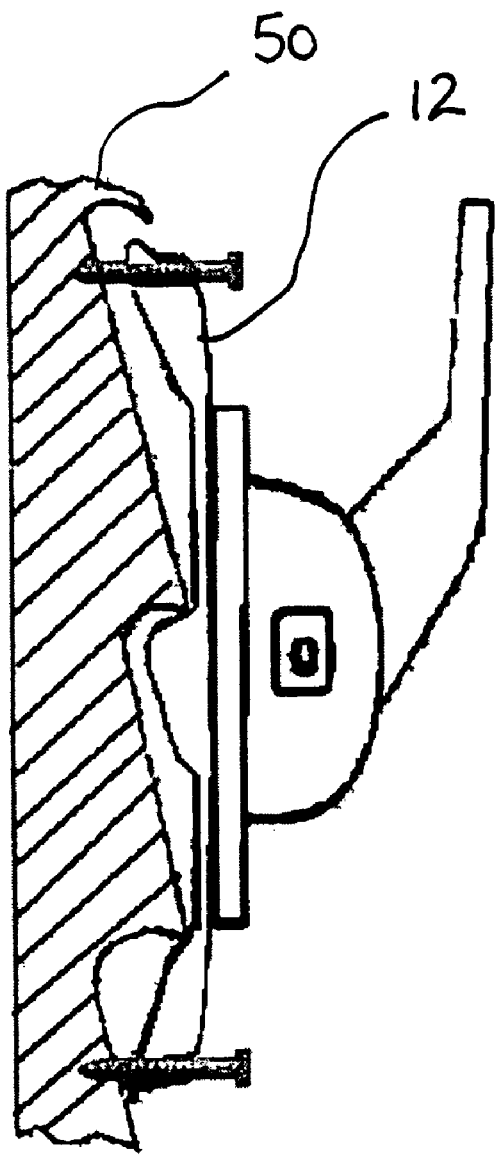
Figure 7D:
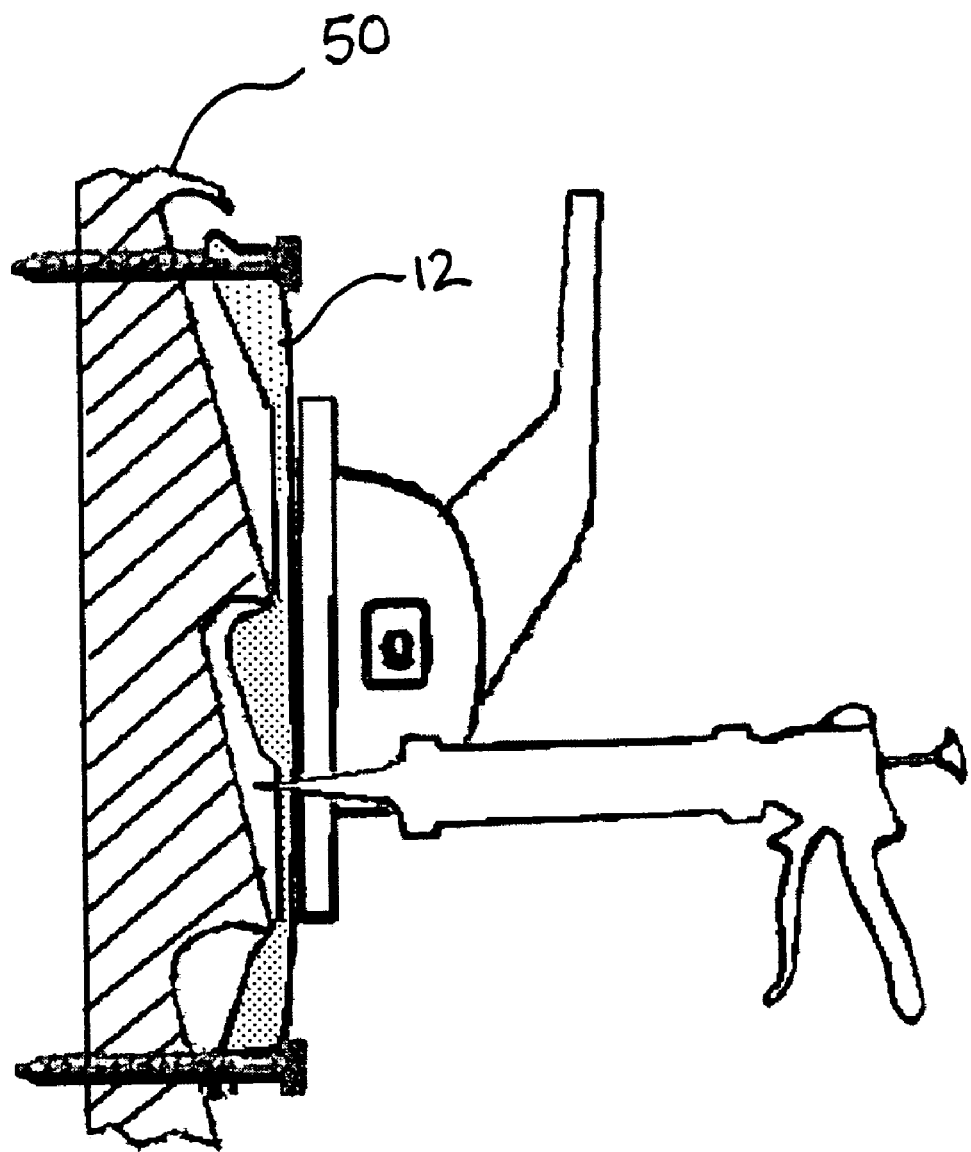
Figure 7E:
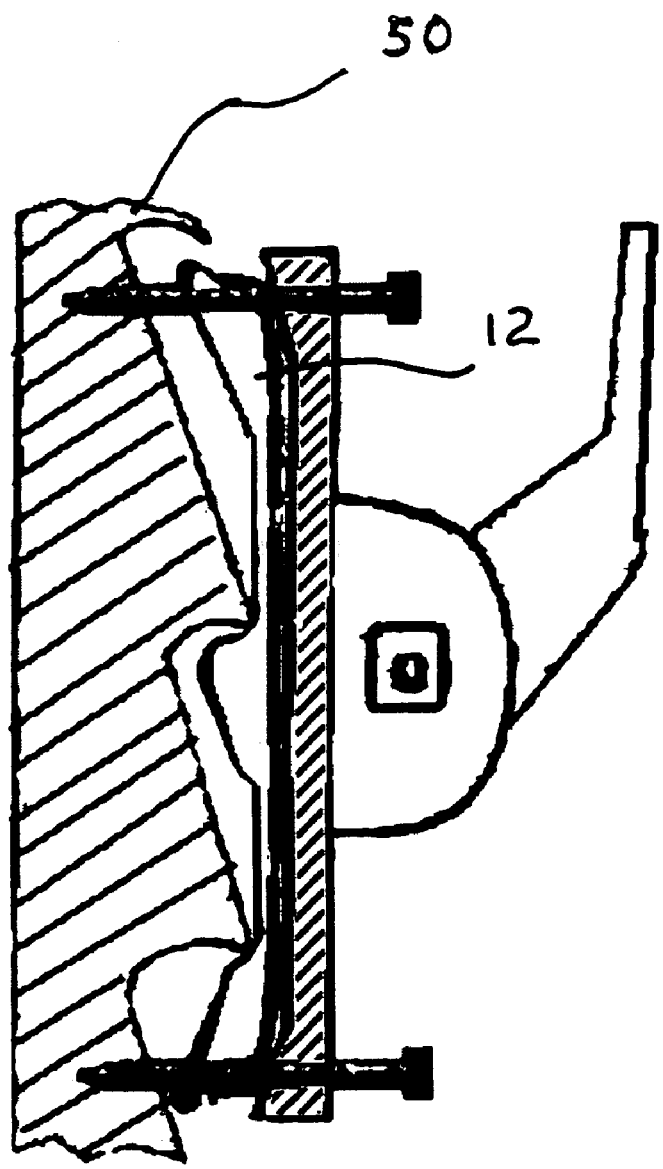

FIG. 6 illustrates in side view, a mounting structure 10 in position of a Double 4 of siding. The siding consists of overlapping shingles 50 in which each shingle has its lower edge held in behind a formation of the other edge of the next lower shingle. The upper edge is fastened to the support structure and the next upper shingle applied, its lower edge slipping in behind the formation at the upper edge of the previous shingle. The mounting structure is positioned so that the various protrusions and formations 30, 36 and 38 straddle the formation of the shingle, the contact occurring at the top and bottom flanges and the central protrusions 30 and formations 36. With a single form it siding contact can still occur at top and bottom flanges and at 30 and 36.

FIGS. 7(*a*) to 7(*e*) illustrate, somewhat diagrammatically, the steps of mounting a satellite dish on a building.

FIGS. 7(*a*) to 7(*e*) the position of the mounting structure is identified to mark the positions of lag bolts, for example, for insertion into studs, if stud positions are known. These positions correspond to the holes 42 in the bosses 18. Pilot holes for the lag bolts, or other, can be drilled. The satellite disk base is then attached to the support structure—FIG. 7(*b*), using the holes 44. The mounting structure and dish pace are then attached to the wall—F*igure* 7(*c*). After attachment of the mounting structures and dish space to the wall, caulking is applied around the periphery of the support structure, such as with clear silicon caulking, to seal the mounting structure to the wall to prevent ingress of moisture and other foreign matter. After mounting on the wall, the satellite dish is mounted on the base plate and aligned as in normal procedures—FIG. 7(*e*).

As an alternative, in some cases, the satellite dish can be mounted on the mounting structure at the same time as the mounting structure is attached to the wall. Lag bolts, or similar, are applied through the holes 44 through the siding into the wall.

The above description of attaching the support structure and base plate is only an example and the various steps can be modified, particularly for articles other than satellite dishes.

It will be appreciated that a mounting structure, in accordance with the present invention, is adaptable to the mounting of various items, apart from satellite dishes. For example, holders for lights, flags, decorative items and even certain external modems or modem connections, internal connection receiver, W.F. adapters and other structural items, without damage to the siding. While particularly suitable for the attachment of articles to a wall, the mounting structure can be used elsewhere, for mountings on an inclined roof for example, where non flat profiles occur, similar to siding shingles. While siding shingles of plastic material have been considered as the most general of the siding materials, the invention is also quite readily used in conjunction with other siding, or cladding, materials, for example cedar shapes.

Figure 8:
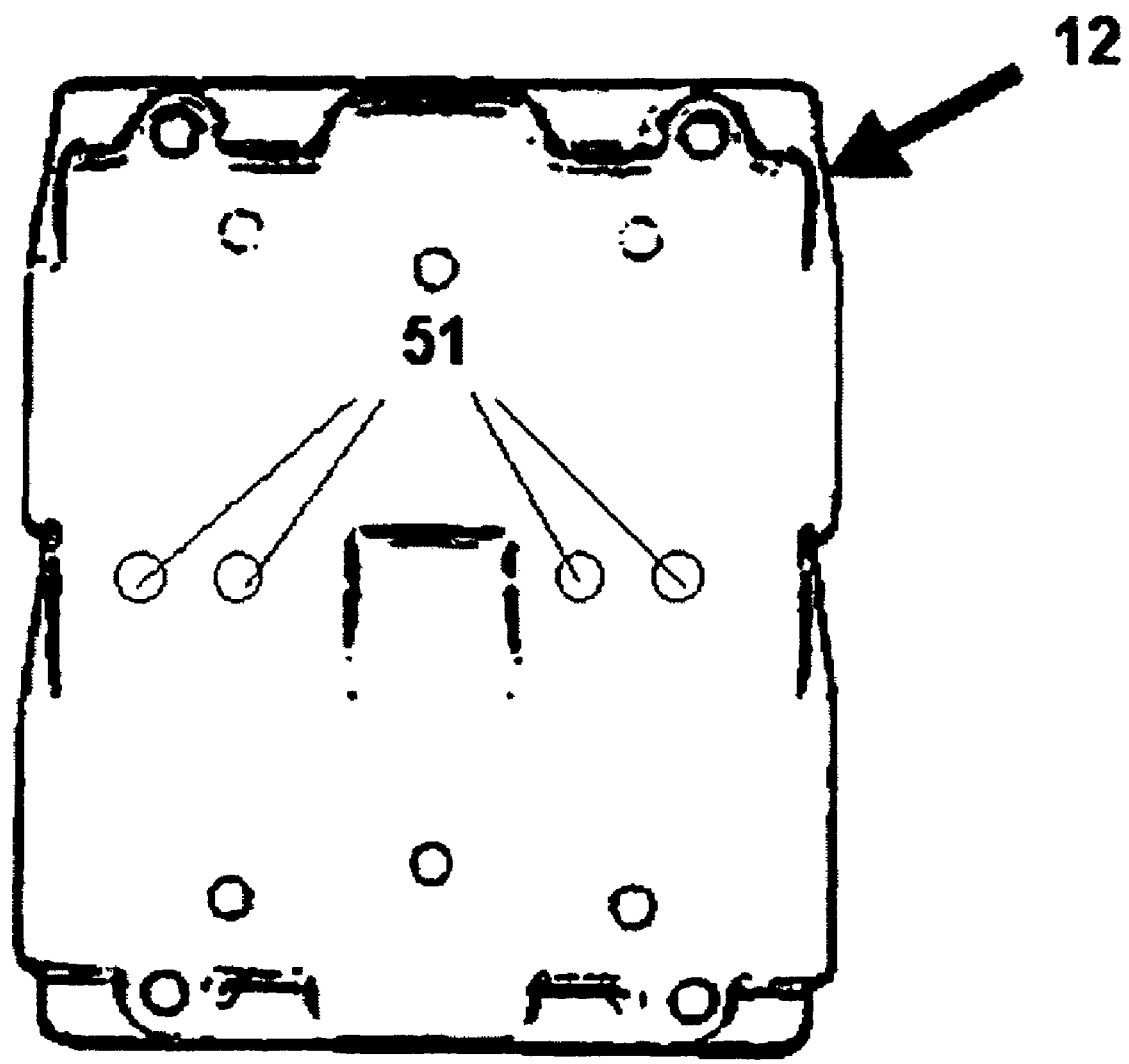
FIG. 8 is a front view of an alternative embodiment of FIG. 1 for permanent mounting.

FIGS. 8 through 15 described in greater detail below, illustrate various alternative embodiments for the mounting and use of the bracket 12 described hereinabove. FIG. 8 is a front view of the bracket illustrating a plurality of mounting apertures 51 for F81 cable connectors. As illustrated, four holes are used to accommodate the maximum cabling possible utilizing a Quad LNB. In most circumstances, only two of the F81 connectors will be employed and the remaining connectors will be capped using terminators.

Figure 9:
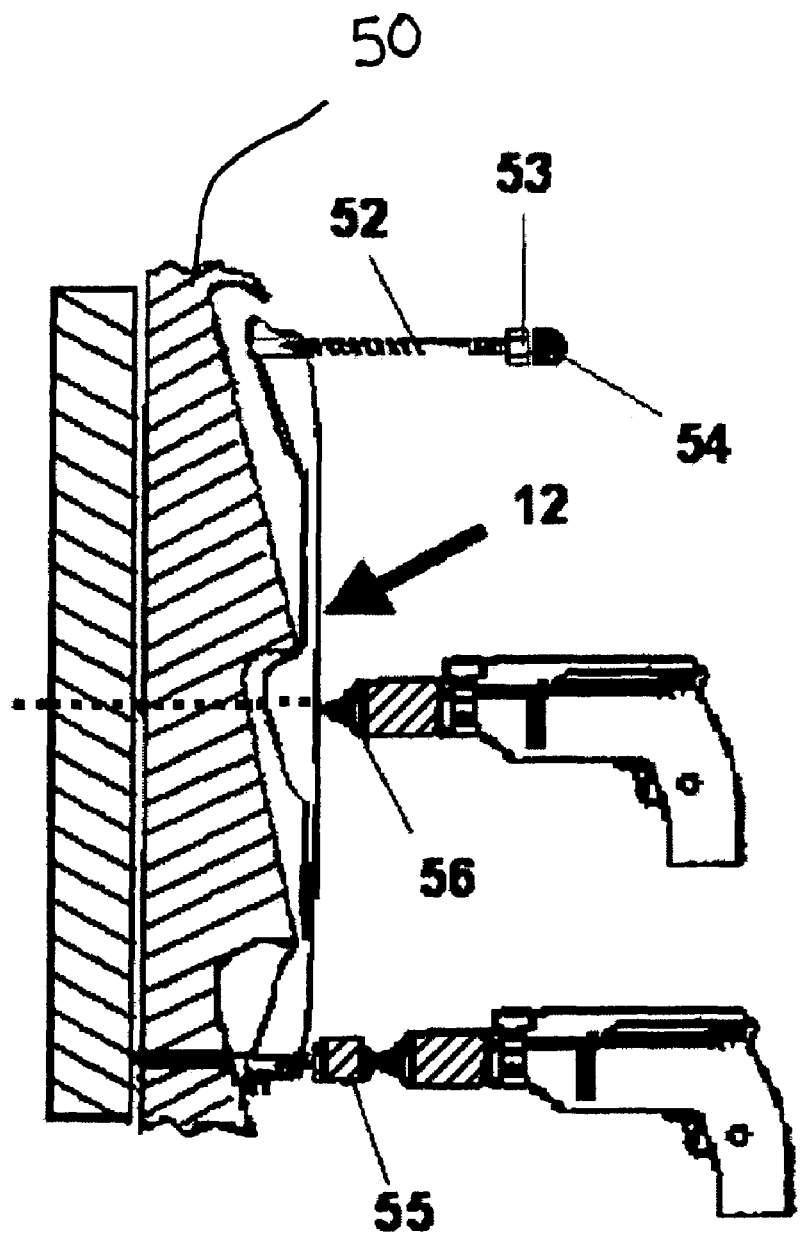
FIG. 9 is a side view illustrating permanent mounting of the bracket.

FIG. 9 is a diagram demonstrating the use of various fasteners; for example and as illustrations, hanger bolts 52 and a ⁵⁄₁₆" nut 53 are used in conjunction with a ⁵⁄₁₆" cap nut 54. As shown, the bracket 12 is held in the desired mount position against the mounting surface. According to one embodiment a drill or other suitable tool (55) may be used to insert a fastener such as a bolt 52. As illustrated, once all four bolts 52 are mounted, drill 55 is then used to drill holes through the wall via the F81 cable connector holes 51. Suitable equipment or tools, (such as wrenches) may be used to remove nuts 53 and 54, after which the bracket 12 is then able to be removed.

Figure 10:
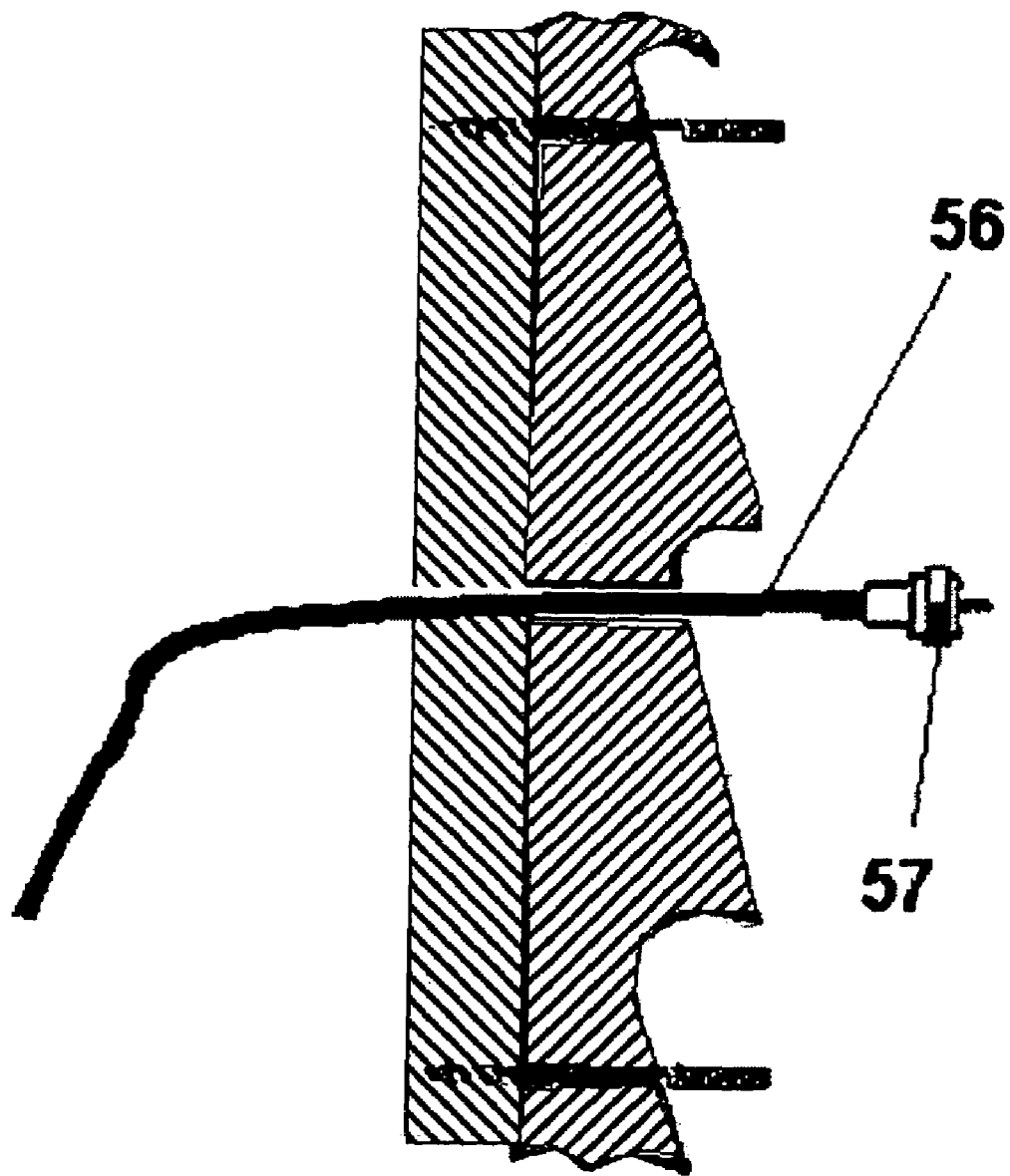
FIG. 10 is a side view of the cable bracket illustrates a cable having been fed through the wall and mounting bracket.

As illustrated in FIG. 10, coaxial cable 56 is then fed through the wall to either grounding blocks or multi switches at the main junction for the home cabling. Cable end connectors 57 are then attached to the exterior end of the cable.

Figures 11A, 11B:
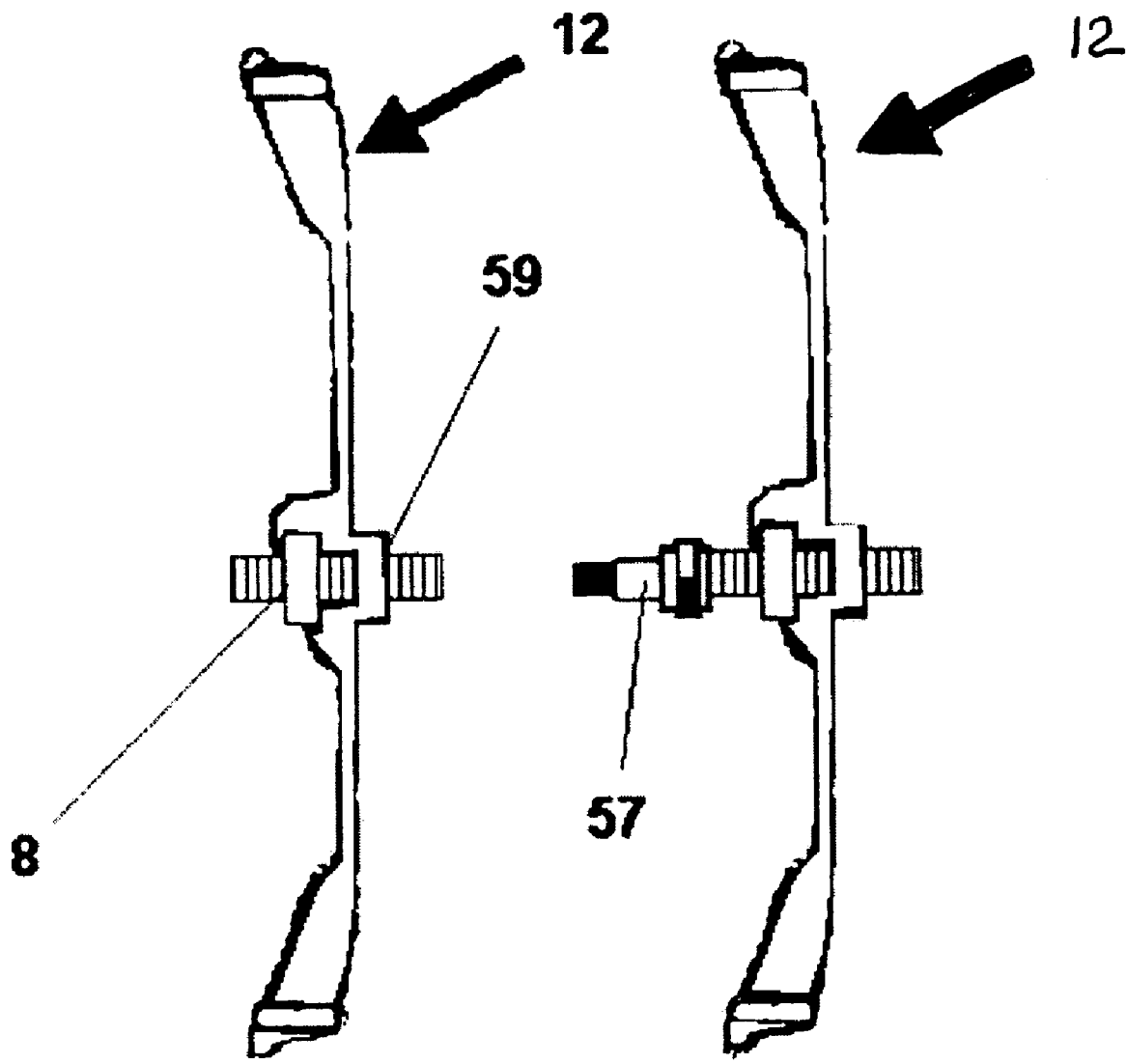
FIGS. 11A and 11B are side views of the mounting bracket having connectors being inserted and connected to the bracket.
Figure 12:
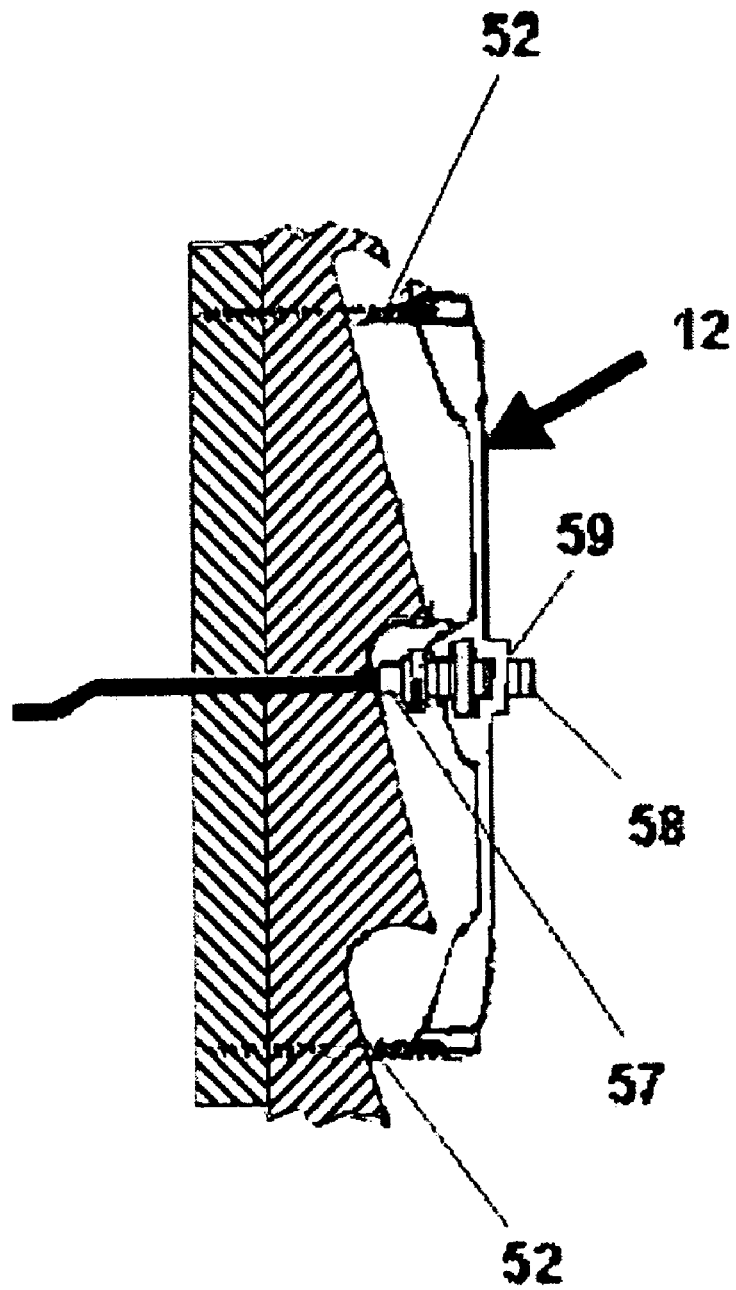
FIG. 12 is a side view of the mounting bracket of FIG. 8.
Figure 13:
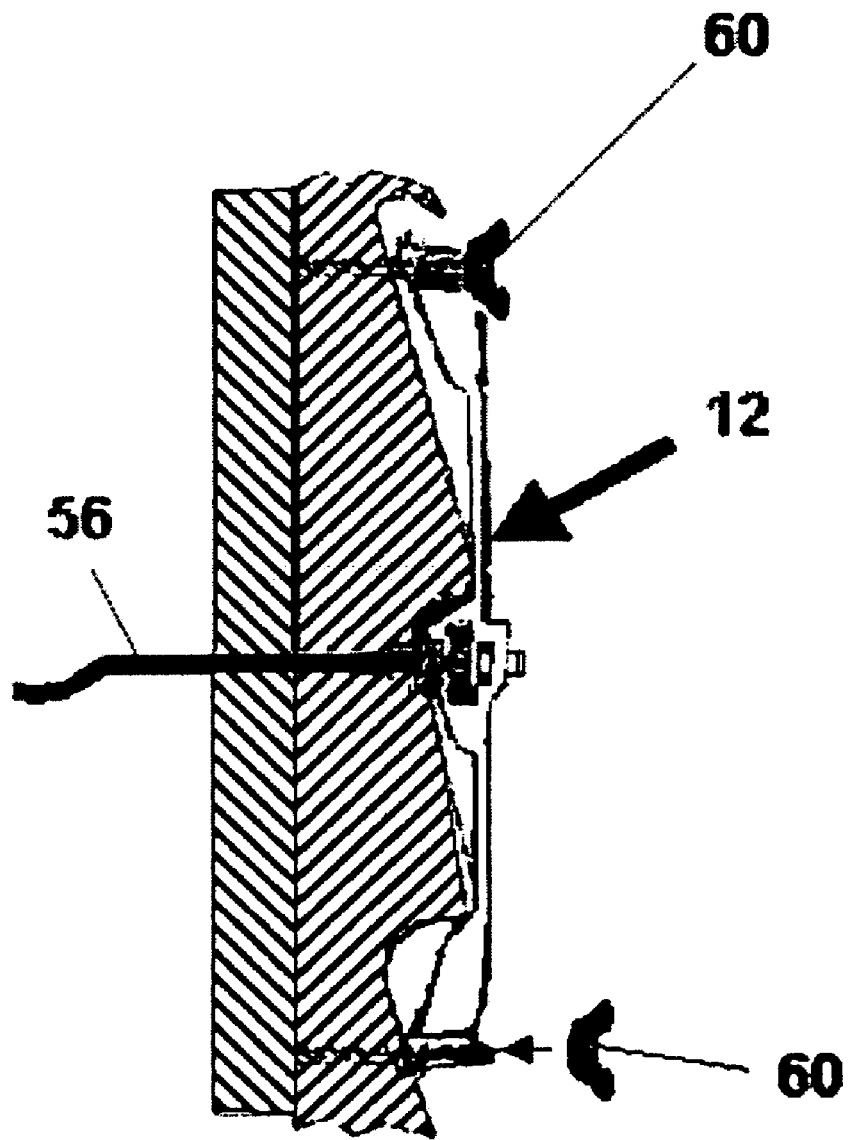
FIG. 13 is a side view of the mounting bracket of FIG. 12 being secured to a wall.

FIG. 11(*a*) demonstrates the mounting of the F81 connectors 58 to the bracket 12 by inserting it through the holes 51 and securing with a nut 59 on the opposite side of the bracket 12. FIG. 11(*b*) demonstrates the connection of the cable end connector 57 to the F81 connector 58. Bracket 12 is then remounted once the cabling is completed, as illustrated in FIGS. 12 and 13.

Figure 14:
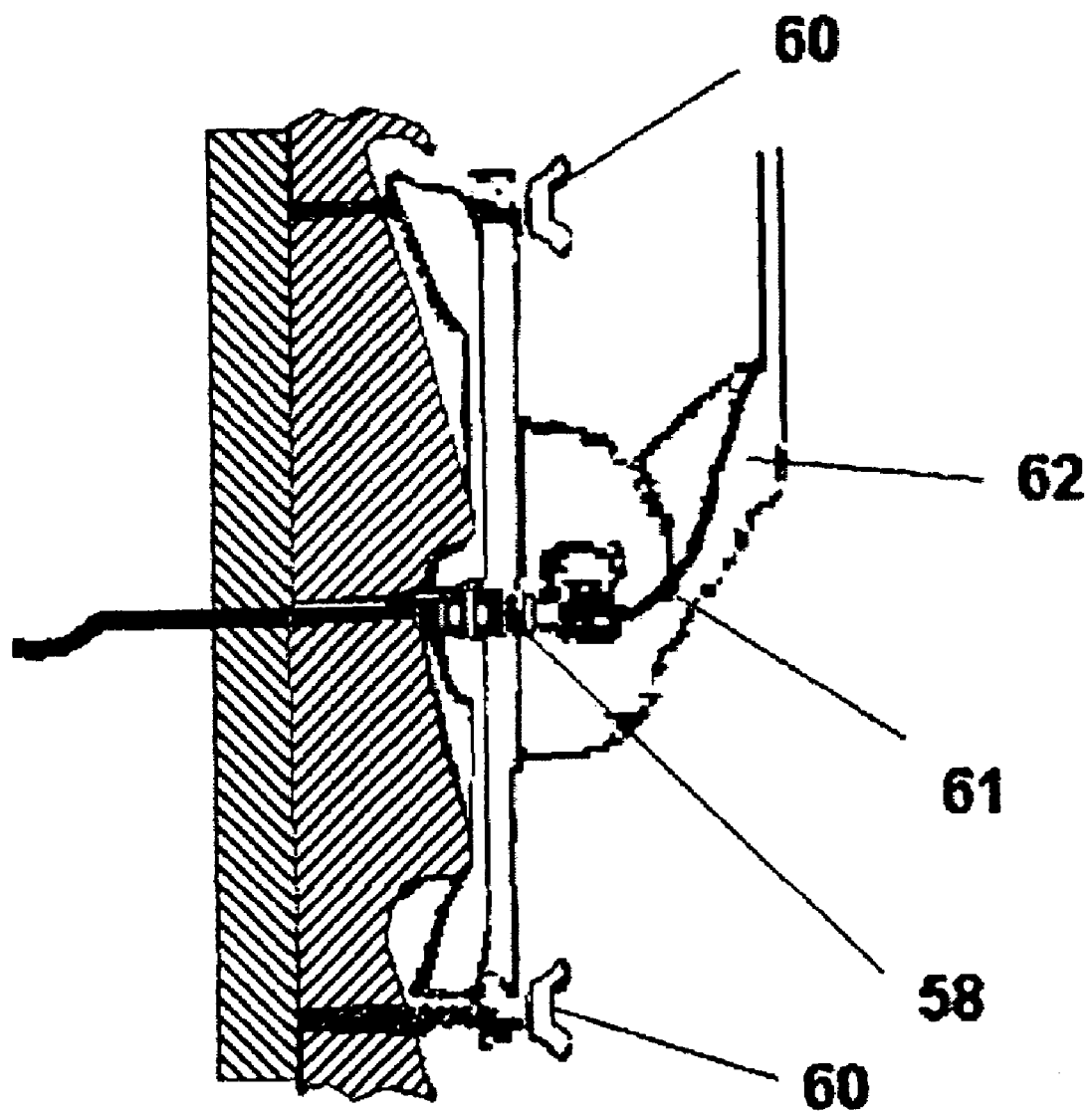
FIG. 14 is a side view of FIG. 12 using different fasteners.

FIG. 14 illustrates the mounting of one type of satellite dish 62 using the ⁵⁄₁₆" wing nuts 60. The cable 61 from the satellite is attached to the F81 connector 58.

Figure 15:
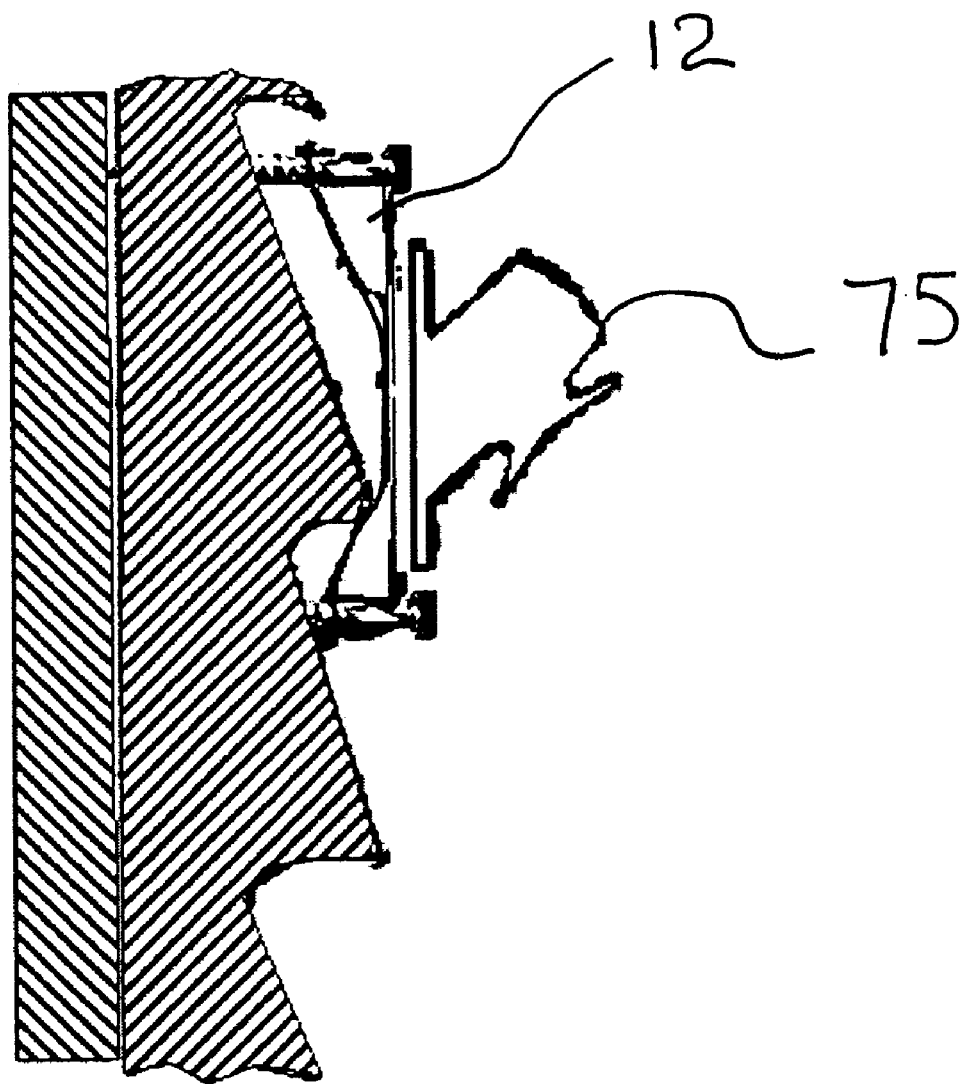
FIG. 15 is a side view of an alternative embodiment of FIG. 1.

In an alternative embodiment, and as illustrated in FIG. 15, bracket 12 is adapted for use with other accessories 75, such as mailboxes, flag holders, etc.

Although a preferred embodiment of the present invention and a method of using the same has been described hereinabove, it shall be understood by those skilled in the art to which the present invention pertains that various modifications may be made to the present invention without departing from the spirit and scope of the appended claims.

I claim:

1. A mounting structure for attachment to a building, comprising:

a substantially planar front panel having an inner surface, side edges and top and bottom flanges at opposed ends of the panel, each flange including a central embossed portion, a boss on each side of the central embossed portion and spaced therefrom, said bosses spaced inward from the side edges of the panel;

a central protrusion extending inwardly from said inner surface of said panel, and a side protrusion at each side edge of the panel extending inwardly from said inner surface, the central and side protrusions in lateral alignment and substantially equal distant from said top and bottom flanges;

an inclined portion at each side of said panel at said top flange, said inclined portions extending inwardly from said inner surface to the top flange;

the arrangement such that the panel straddles a siding shingle and engages with the profile of the shingle.

2. A structure as claimed in claim 1, including flange portions extending between said bosses and said central embossed portion at said top and bottom flanges.

3. A structure as claimed in claim 2, including flange portions extending between each boss and the adjacent side at said top and bottom flanges.

4. A structure as claimed in claim 1, said central protrusion having an inclined surface extending inwardly and upwardly from said inner surface, and a front wall extending from an upper end of said inclined surface to said inner surface.

5. A structure as claimed in claim 4, including an inclined portion extending inwardly and upwardly from said inner surface at each side of said panel adjacent said upper flange, each said inclined portion blending at its upper end with said flange portions extending between said boss and the adjacent side edge.

6. A structure as claimed in claim 1, in said side protrusion having an inclined surface extending inwardly and upwardly from said inner surface, and a front wall extending from an upper end of said inclined surface to said inner surface.

7. A structure as claimed in claim 1, including apertures in each boss for passage of attachment members for attaching the structure to a building.

8. A structure as claimed in claim 7, including apertures in said panel for attachment of an article to the mounting structure.

* * * * *